Aug. 4, 1931.   J. L. BROWNELL   1,817,125
VEHICLE BODY
Filed Jan. 17, 1930    2 Sheets-Sheet 1
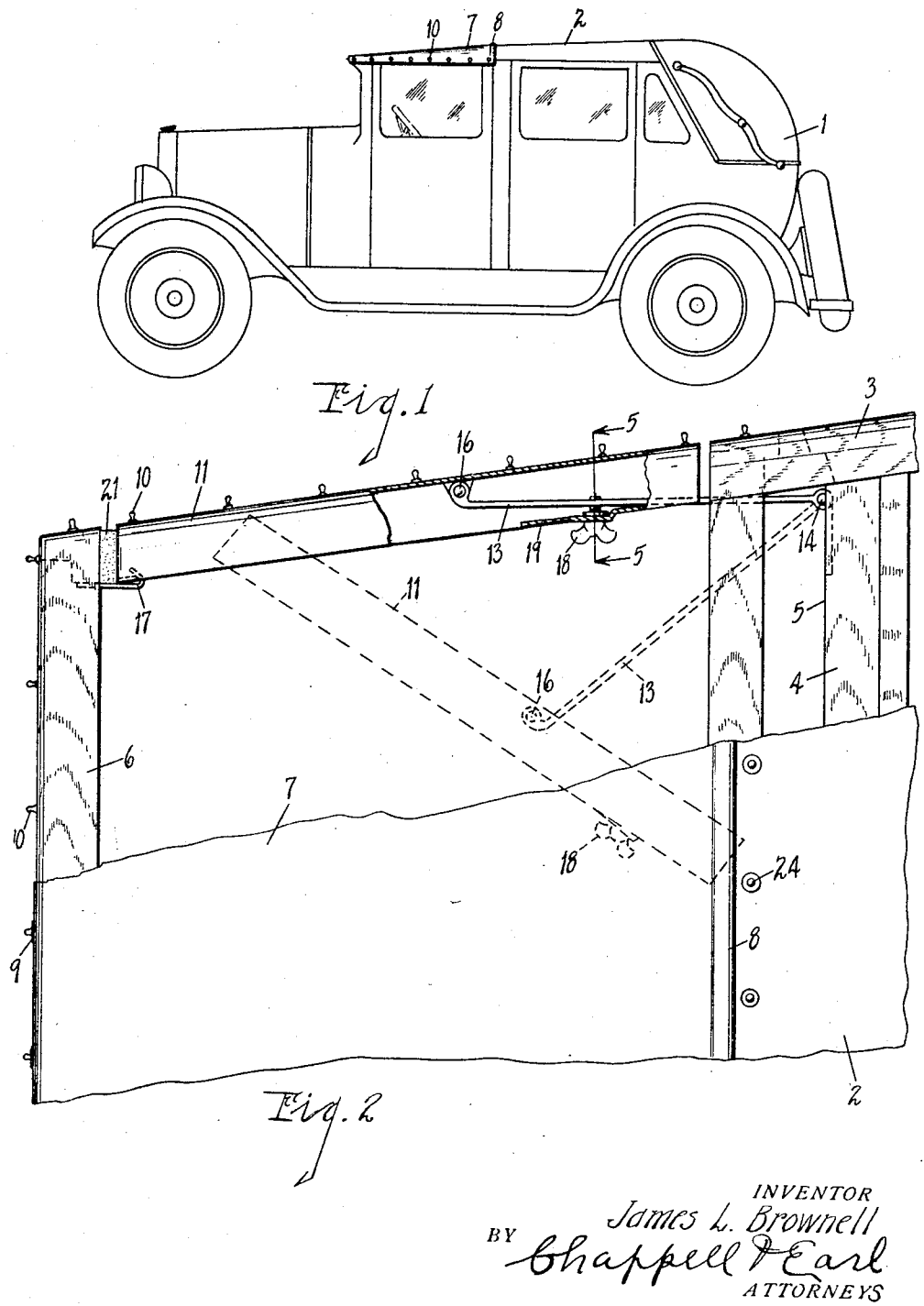
INVENTOR
James L. Brownell
BY Chappell & Earl
ATTORNEYS

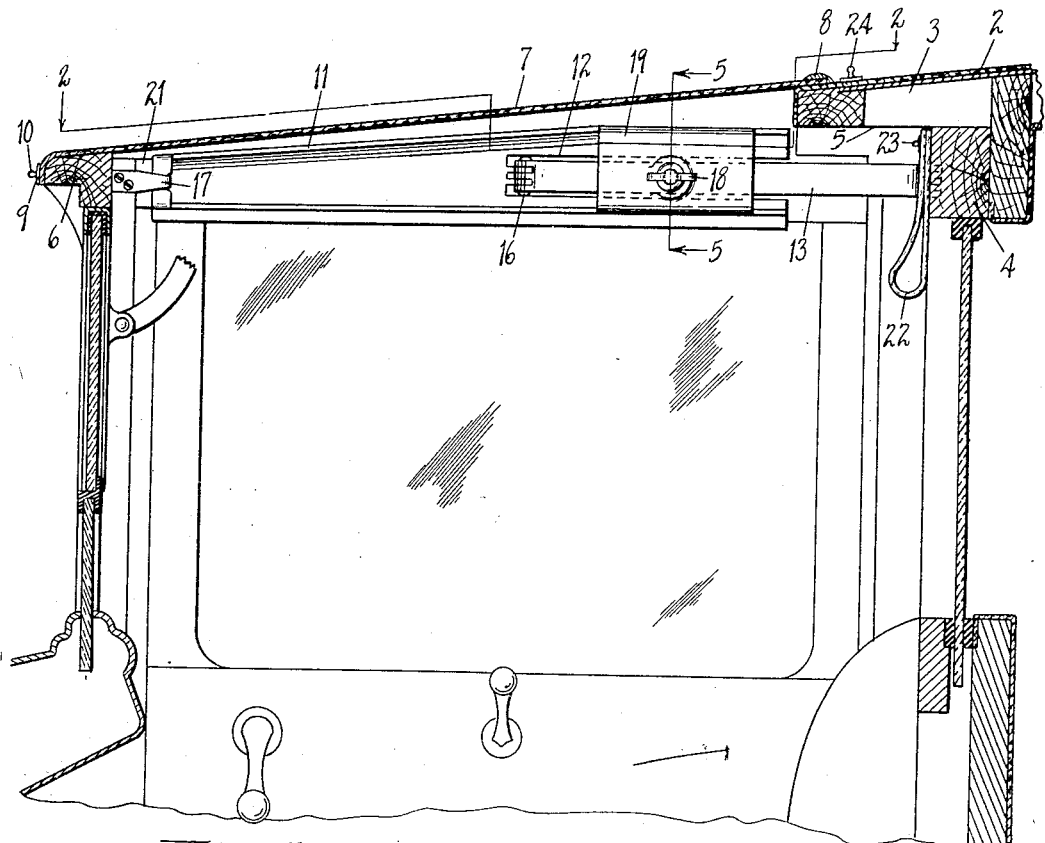
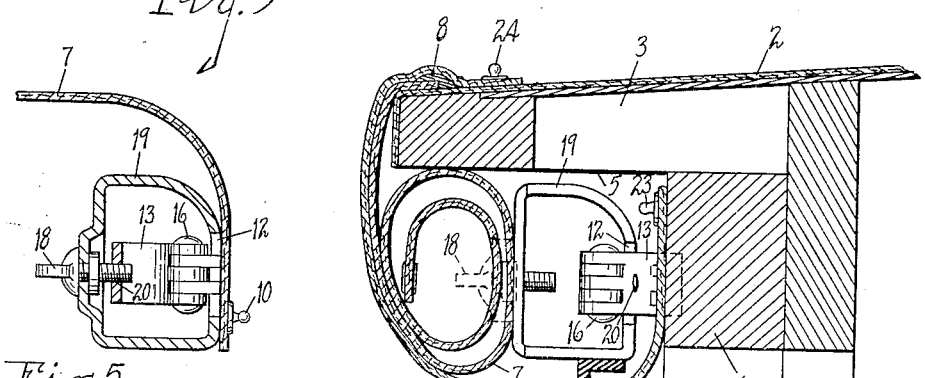

Patented Aug. 4, 1931

1,817,125

UNITED STATES PATENT OFFICE

JAMES L. BROWNELL, OF KALAMAZOO, MICHIGAN, ASSIGNOR TO CHECKER CAB MANUFACTURING CORPORATION, OF KALAMAZOO, MICHIGAN, A CORPORATION OF NEW JERSEY

VEHICLE BODY

Application filed January 17, 1930. Serial No. 421,340.

The main objects of this invention are:

First, to provide a vehicle body having a driver's seat section provided with a collapsible top or cover which may be quickly converted or changed from an open top to a closed top.

Second, to provide a vehicle body having a collapsible top section in which the collapsible top section when erected is neat and attractive in appearance and effectively supported.

Third, to provide a structure of this class in which the collapsible top section may be compactly collapsed and arranged and when collapsed does not disfigure the permanent or fixed top.

Objects relating to details and economies of my invention will appear from the description to follow. The invention is defined and pointed out in the claims.

A structure which is a preferred embodiment of my invention is illustrated in the accompanying drawings, in which:

Fig. 1 is a side elevation of a motor vehicle embodying the features of my invention.

Fig. 2 is a fragmentary view partially in section on line 2—2 of Fig. 3.

Fig. 3 is a detail vertical longitudinal section with the collapsible top or cover in erected position.

Fig. 4 is a fragmentary vertical section with the collapsible top or cover section in collapsed position.

Fig. 5 is a detail view on line 5—5 of Figs. 2 and 3.

Referring to the drawings, 1 represents the vehicle body generally and 2 the top thereof, the top being provided with a suitable deck 3. This deck has an inner cross member 4 disposed in spaced relation to the front edge of the deck providing a forwardly and downwardly facing recess 5.

The windshield frame 6 is disposed in spaced relation to the forward end of the deck providing an opening above the front seat. This open section is provided with a flexible collapsible cover 7 which is secured at its rear edge as 8 at the forward end of the deck.

The cover 7 is provided with fastener members 9 adapted to be engaged with the studs 10 on the windshield frame. Cover supporting side bars 11 are provided, these also having fasteners 10 with which the edges of the cover may be engaged. These bars 11 are of channel cross section and have longitudinal slots 12 extending from their rear ends.

The bars are supported by links 13 pivoted at 14 to the cross member 4 of the deck and pivoted at 16 to the inside of the cover supporting bars 11. The slots 12 are in the plane of these links so that the links may swing through the slots to permit the collapsing of the links upon the cross members 4 of the deck and of the bars upon the links.

To support the bars in erected position their front ends are engaged with rearwardly projecting outwardly facing hooks 17 on the windshield frame, the bars being rigidly connected to the links after engagement with the hooks by means of the thumb screws 18 which are swiveled in the cross pieces 19 on the bars. These screws are threaded into holes 20 in the links so that the bars are rigidly supported in erected position, the links in effect becoming bar extensions when the bars are erected.

Buffers or cushions 21 are arranged between the frame ends of the bars and the windshield frame, the tightening of the screws acting to force the ends of the bars against these cushions, thereby preventing rattling of the parts.

When it is desired to collapse the cover, it is disengaged from the studs 10 on the bars 11 and the windshield frame, the screws 18 released and the bars and links collapsed into the recess 5, the apron 22 however having previously been released from its supporting studs 23 so that it may be passed around the collapsed cover supporting bars and the roll cover as shown in Fig. 4 and engaged with studs 24 provided therefor on the top 2.

With this arrangement of parts, the collapsible cover may be quickly erected or collapsed and when erected the collapsible cover or top is held in such position that it presents a neat appearance as an extension of the permanent section and when collapsed does not mar the appearance of the permanent top.

I have illustrated and described my improvements in an embodiment which I have found very practical. I have not attempted to show various modifications and adaptations which I contemplate or which might be desirable in embodying my improvements to different types of vehicle bodies but it is believed that this disclosure will enable those skilled in the art to embody and adapt the same as may be desired.

Having thus described my invention, what I claim as new and desire to secure by Letters Patent, is:

1. The combination of a vehicle body, of a top deck having an inner cross member disposed in spaced relation to its front edge providing a forwardly facing recess, a windshield frame spaced from the top deck, rearwardly projecting outwardly facing hooks disposed at the ends of said windshield frame, channeled longitudinally slotted cover side bars, links pivotally mounted on said cross member and pivotally connected to said bars in the plane of their said slots so that the links may be swung through the slots to collapse the bars upon the links and into said forwardly facing recess of said deck, screws swiveled on said bars to engage said links when the bars are in erected position in engagement with said hooks, cushion members arranged between the forward ends of said bars and said windshield frame, a flexible cover secured at its rear edge to the front end of said deck, said windshield frame, cover bars and said covers having coacting detachable fasteners whereby the cover may be detachably secured thereto or collapsed and disposed upon the top bars collapsed within said recess, and an apron secured at one edge to said cross member and adapted to be passed around the collapsed cover bars and cover, said deck apron being provided with coacting detachably engageable fastener members.

2. The combination in a vehicle body, of a top deck having an inner cross member disposed in spaced relation to its front edge providing a forwardly facing recess, a windshield frame spaced from the top deck, rearwardly projecting outwardly facing hooks disposed at the ends of said windshield frame, channeled longitudinally slotted cover side bars, links pivotally mounted on said cross member and pivotally connected to said bars in the plane of their said slots so that the links may be swung through the slots to collapse the bars upon the links and into said forwardly facing recess of said deck, screws swiveled on said bars to engage said links when the bars are in erected position in engagement with said hooks, and a flexible cover secured at its rear edge to the front end of said deck, said windshield frame, cover bars and said covers having coacting detachable fasteners whereby the cover may be detachably secured thereto or collapsed and disposed upon the top bars collapsed within said recess.

3. The combination in a vehicle body, of a top deck having a forwardly and downwardly facing recess at its front end, a windshield frame spaced from the top deck providing an open top section between the windshield and the deck, cover side bars, links pivotally mounted in said recess to collapse therein and pivotally connected to said side bars intermediate their ends, said side bars being slotted to receive said links, means for rigidly securing said side bars to said links with the bars in their extended position, side bar engaging members on said windshield frame, a flexible cover secured at its rear edge to the front end of said deck, said windshield frame, cover bars and said covers having coacting detachable fasteners whereby the cover may be detachably secured thereto or collapsed and disposed in said recess, and an apron secured at one end within said recess and adapted to be passed around the collapsed cover bars and cover and detachably secured upon the forward edge of the deck.

4. The combination in a vehicle body, of a top deck, a windshield frame spaced from the forward edge of said top deck, hooks disposed at the ends of said windshield frame, channeled longitudinally slotted cover supporting bars, links pivotally mounted on said deck to collapse thereon and pivotally connected to said bars in the plane of their said slots so that the links may be swung through the slots to clamp the bars upon the links, and screws swiveled on said bars to engage said links when the bars are in erected position in engagement with said hooks.

5. The combination in a vehicle body, of a top deck, a windshield frame spaced from the forward edge of said top deck, hooks disposed at the ends of said windshield frame, channeled longitudinally slotted cover supporting bars, links pivotally mounted on said deck to collapse thereon and pivotally connected to said bars in the plane of their said slots so that the links may be swung through the slots to clamp the bars upon the links, and means for securing said links and bars together when in erected position.

In witness whereof I have hereunto set my hand.

JAMES L. BROWNELL.